(12) United States Patent
Erdman et al.

(10) Patent No.: US 7,071,579 B2
(45) Date of Patent: Jul. 4, 2006

(54) WIND FARM ELECTRICAL SYSTEM

(75) Inventors: William L. Erdman, Orinda, CA (US); Terry M. Lettenmaier, Seattle, WA (US)

(73) Assignees: Global EnergyConcepts,LLC, Kirkland, WA (US); William Erdman, Orinda, CA (US)

( * ) Notice: Subject to any disclaimer, the term of this patent is extended or adjusted under 35 U.S.C. 154(b) by 59 days.

(21) Appl. No.: 10/458,588

(22) Filed: Jun. 9, 2003

(65) Prior Publication Data

US 2003/0227172 A1 Dec. 11, 2003

Related U.S. Application Data

(60) Provisional application No. 60/386,442, filed on Jun. 7, 2002.

(51) Int. Cl.
*F03D 9/00* (2006.01)
*H02P 9/04* (2006.01)

(52) U.S. Cl. .......................................... 290/55; 290/44
(58) Field of Classification Search .................. 290/44, 290/55, 43, 54; 415/4.5
See application file for complete search history.

(56) References Cited

U.S. PATENT DOCUMENTS

| | | | |
|---|---|---|---|
| 4,948,209 A * | 8/1990 | Baker et al. .................. | 322/10 |
| 5,083,039 A | 1/1992 | Richardson et al. | |
| 5,155,375 A | 10/1992 | Holley | |
| 5,225,712 A | 7/1993 | Erdman | |
| 5,798,631 A * | 8/1998 | Spee et al. ..................... | 322/25 |
| 6,137,187 A | 10/2000 | Mikhail et al. | |
| 6,285,090 B1 * | 9/2001 | Brutsaert et al. ............. | 290/55 |
| 6,340,851 B1 * | 1/2002 | Rinaldi et al. ................ | 307/82 |
| 6,420,795 B1 | 7/2002 | Mikhail et al. | |
| 6,479,907 B1 * | 11/2002 | Eriksson et al. .............. | 290/44 |
| 6,566,764 B1 * | 5/2003 | Rebsdorf et al. ............. | 290/44 |
| 6,670,721 B1 * | 12/2003 | Lof et al. ...................... | 290/44 |
| 2004/0075278 A1 * | 4/2004 | Canini et al. ................. | 290/44 |
| 2005/0046196 A1 * | 3/2005 | Larsen ......................... | 290/44 |

OTHER PUBLICATIONS

IEEE Std 519-1992; IEEE Recommended Practices and Requirements for Harmonic Control in Electrical Power Systems, 1993, Institute of Electrical and Electronic Engineers, Inc., USA, pp. 46-47.

(Continued)

*Primary Examiner*—Julio Gonzalez Ramirez
(74) *Attorney, Agent, or Firm*—John Vanden Bosche (57) ABSTRACT

An approach to wind farm design using variable speed wind turbines with low pulse number electrical output. The output of multiple wind turbines are aggregated to create a high pulse number electrical output at a point of common coupling with a utility grid network. Power quality at each individual wind turbine falls short of utility standards, but the aggregated output at the point of common coupling is within acceptable tolerances for utility power quality. The approach for aggregating low pulse number electrical output from multiple wind turbines relies upon a pad mounted transformer at each wind turbine that performs phase multiplication on the output of each wind turbine. Phase multiplication converts a modified square wave from the wind turbine into a 6 pulse output. Phase shifting of the 6 pulse output from each wind turbine allows the aggregated output of multiple wind turbines to be a 24 pulse approximation of a sine wave. Additional filtering and VAR control is embedded within the wind farm to take advantage of the wind farm's electrical impedance characteristics to further enhance power quality at the point of common coupling.

9 Claims, 11 Drawing Sheets

OTHER PUBLICATIONS

BOURBEAU, Twelve-Pulse Converter With Auto-Balance and Integrated Magnetics Cuts THD, Nov. 1999, PCIM, p. 66.

BOURBEAU, Power Quality Testing of an Advanced Variable Voltage Wind Turbine Generator Controller, May 1994, Windpower Proceedings, American Wind Energy Association, Washington, DC, pp. 221-230.

McNerney et al, The Statistical Smoothing of Power Delivered to Utilities by Multiple Wind Turbines, 1992, IEEE Transactions on Energy Conversion, vol. 7, No. 4, pp. 644-664.

Heier, Siegfried, Grid Integration of Wind Energy Conversion Systems, John Wiley & Sons, Inc, 2002, ISBN: 0-471-97143-X, pp. 201-203.

* cited by examiner

WIND FARM ELECTRICAL SYSTEM

RELATED APPLICATIONS

This application claims priority under 35 U.S.C. § 119(e) to U.S. Provisional Patent Application No. 60/386,442 which was filed on Jun. 7, 2002 and which is incorporated herein by reference.

STATEMENT REGARDING FEDERALLY SPONSORED RESEARCH

This invention was made with Government support under Contract No. YAM-1-30203-01 awarded by the Department of Energy. The Government has certain rights in this invention.

FIELD OF THE INVENTION

This invention relates generally to wind turbine generation systems that operate at variable speed and require a high level of power quality at the utility interconnection point. More specifically, the invention relates to the conversion of variable voltage, variable frequency wind generated power into fixed voltage and fixed frequency electrical power which is compatible to the interconnected utility grid system.

BACKGROUND OF THE INVENTION

The generation of electricity from wind power has become commonplace over the last two decades. The wind, as a renewable energy source is free and, with the advent of certain technologies such as advanced power conversion and microprocessors, wind power has become competitive with more traditional power generation methods. In its infancy, wind energy relied principally on asynchronous generators which were directly connected the utility grid system. Because the utility is fixed voltage and frequency, these generators and the turbines to which they were connected ran at essentially constant speed. The speed varied only in so far as the wind caused the generator to traverse its torque-slip curve.

Constant speed operation of wind turbines was effective for many years. However, it eventually became recognized that running a wind turbine at variable speed could enhance the ability of the turbine to capture energy while providing reduction in mechanical loads. With this recognition, came the idea of running wind turbines at variable speed in such a way so as to maintain a constant tip speed ratio on the rotor blades when the wind turbine is operating below rated power. This requires increasing the rotor speed in direct proportion to the wind speed. In using this approach an additional 4–6% energy capture was achievable with a turbine depending on certain site parameters such as mean wind speed and turbulence. However, to implement such a turbine effectively requires the introduction of a variable speed solid state converter. Examples of such converters are included in U.S. Pat. Nos. 5,083,039, 5,225,712, 5,155,375, 6,137,187, and 6,420,795, all of which are incorporated herein by reference.

The introduction of variable speed also presented additional advantages for the turbine design. For example, by appropriately controlling the torque on the turbine's generator, mechanical loads could be reduced in the wind turbine structure. Reduction in mechanical loads is particularly beneficial for reducing the size, weight, cost, and rated capacity of the wind turbine's gearbox. This allows for less material to be used in the turbine and a lower capital coast can be achieved.

Solid state converters for providing variable speed operation are important in dealing with the utility interconnection power quality. In the early constant speed turbines, the asynchronous generator consumed reactive power from the utility grid for excitation. This reactive power caused voltage regulation problems with local utilities as significant reactive power consumption can reduce utility system voltage. At certain wind farm sites where a large number of turbines are sited, this is a significant problem and power factor correction capacitance must be installed to supply the reactive power requirements of the generators. Variable speed turbines, with their solid state power converters inserted between the generators and utility grid, are capable of supplying the asynchronous generators with their reactive power and eliminating this need from the utility system. Further, these solid state converters are capable of controlling the reactive power at the utility interconnection point and they can supply or absorb reactive power in such a way as to support other loads connected to the utility system. In this way, these turbines have become helpful to the utilities.

U.S. Pat. Nos. 5,083,039 and 5,225,712 which are incorporated herein by reference discuss the use of a power converter to control an asynchronous generator system on a turbine. These devices require an active rectifier system to decouple the magnetic field and torque components of the generator. The system is effective at providing high bandwidth torque response and accuracy. The utility inverter is connected to the active rectifier via a DC link which decouples the voltage and current operation on the generator from the utility. The utility side converter is pulse width modulated (PWM) to provide a high quality, low harmonic distortion current wave form back into the utility. The turbine-converter system is designed to meet the high quality power standards such as IEEE 519 with the wind turbine AC connection serving as the point-of-common-coupling (PCC). In a large wind farm with a large number of turbines, the belief is that connecting a large number of turbines which individually meet utility power quality requirements will result in the wind farm itself meeting the utility power quality requirements with the PCC being the utility transmission system. The extension of the windturbine to wind farm power quality may or may not be factual as there are other items in the wind farm which are capable of adversely affecting the wind farm power quality. An example would be turbine transformers which absorb reactive power and which can distort the current wave form as the core of the transformer moves into or near saturation. Additionally, supplying or absorbing reactive power within the wind farm has the penalty of increasing the load on all of the current carrying conductors within the confines of the wind farm.

U.S. Pat. Nos. 6,137,187 and 6,420,795 incorporated herein by reference are other examples of the variable speed wind turbine systems which utilize an asynchronous generator and a solid state power converter. These devices differ from that of U.S. Pat. Nos. 5,083,039 and 5,225,712 however, in that the converter supplies the wound rotor of the generator with the stator directly connected to the utility grid. In this case, the converter carries only a portion of the total power and can be downsized depending upon the slip range that the generator operates over. Since most benefits of energy capture and load mitigation can be realized with a 1.5:1 speed range, the generator can operate as low as 30% subsynchronous slip to 30% supersynchronous at the high speed. This then allows the converter to be rated at approximately 30% of the total turbine power rating. In this system, reactive power can be controlled by over or under exciting the wound rotor. This is done by separating the current in the rotor into a magnetizing and torque producing components. By under exciting the magnetizing component of the rotor circuit, the generator absorbs reactive power from the stator and utility connection. As excitation is brought up on the rotor, less and less reactive power is supplied by the utility to the stator. Finally, at the unity power factor point, the generator is fully excited from the rotor and no reactive power is supplied by the utility. If the rotor magnetic excitation is increased further, then the generator begins to supply reactive power back to the utility. Just as in U.S. Pat. Nos. 5,083,039 and 5,225,712, the power quality is measured and met at the wind turbine, not necessarily at the wind farm.

Although the art described focuses power quality on the wind turbine itself, it is customary in wind farm installations for the PCC to be defined as the point of connection between the entire wind farm and the utility transmission system. The invention described herein presents a low cost, robust integration of the wind farm collection system and the included multiple turbine converters. The invention identifies the power quality PCC as the wind farm interconnection point and not as the turbines themselves. In small installations the PCC would be the utility distribution system and in larger wind farms, greater than a few megawatts, this would be at the utility subtransmission level.

SUMMARY OF THE INVENTION

In accordance with the illustrated embodiment herein, the present invention includes a variable speed wind turbine consisting of a turbine rotor that drives a multiphase generator, a power converter with a generator side rectifier and a utility side inverter. The generator side rectifier contains passive or active switching elements that convert the variable frequency AC generator voltage and current to a DC voltage and current. The generator side rectifier can control the generator to operate at a prescribed speed and torque. The utility side inverter contains switches which control and define a certain AC current wave form. Additionally, the present invention has the following four key elements. First, by integrating the design the of the collection system into the turbine converter design, a high pulse count, high quality utility current wave form can be created at a wind farm interconnection point while utilizing low pulse count utility side inverters on each turbine. This is done by grouping of turbines and proper selection of configurations of the turbines transformers to modify the low pulse outputs such that their sum is a high pulse count, utility quality wave form. Secondly, again by integrating the collection system design into the turbine converter design, impedances in combination with power factor and/or VAR control capacitance can be used effectively to provide current harmonic reduction and filtering at a wind farm interconnection point. By strategically locating the collection system filter within the wind farm, the impedances can aid in the harmonic reduction of the low pulse count turbine power converters. Finally, wind farm dynamic power factor and reactive power (VAR) support may be achieved with a separate reactive power apparatus consisting of an active control device together with switchable VAR control correction capacitors. The active control device may also be capable of sourcing harmonic cancellation currents to further improve the wind farm harmonic current distortion. The reactive power apparatus is used to control reactive power of the entire wind farm and not just that of a given wind turbine. The features described herein will be delineated for a particular wind turbine, collection system, and utility interconnection architecture. This architecture will include a permanent magnet (PM) synchronous generator, SCR rectifier to the DC link, and a line commutated SCR inverter back to the utility. The DC storage device is a DC link reactor. A wind farm filter system is effective in maintaining a relatively fixed power factor within the windplant collection system. A reactive power apparatus consisting of switched capacitors and an actively controlled, solid state based VAR control/harmonic filter is included in the wind farm collection system. The methods described, however, are easily extended to include the cases of the wound field synchronous generator and squirrel cage induction generator, as well as, forced commutated utility inverters with defined characteristic harmonic content. This latter case of inverters would include those using low frequency switching devices such as the GTO (gate turn off thyristor), MCT (MOS controlled thyristor), or other devices.

The features and advantages delineated in this specification are not all-inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate the inventive subject matter, resort to the claims being necessary to determine such inventive subject matter. It is intended that the present invention is applicable to a wide range of multiphase generators including wound field synchronous, permanent magnet (PM) synchronous, and squirrel cage induction generators. An embodiment detailed herein makes use of a PM generator with a SCR rectifier and SCR inverter.

DETAILED DESCRIPTION OF THE DRAWINGS

Disclosed herein is a method for combining simple wave form output from several inexpensive inverters in a wind farm collection system to create a high power quality approximation of a sine wave suitable for utility interconnection. Further disclosed are several devices which may be used to implement the method of the present invention.

Figure 1:
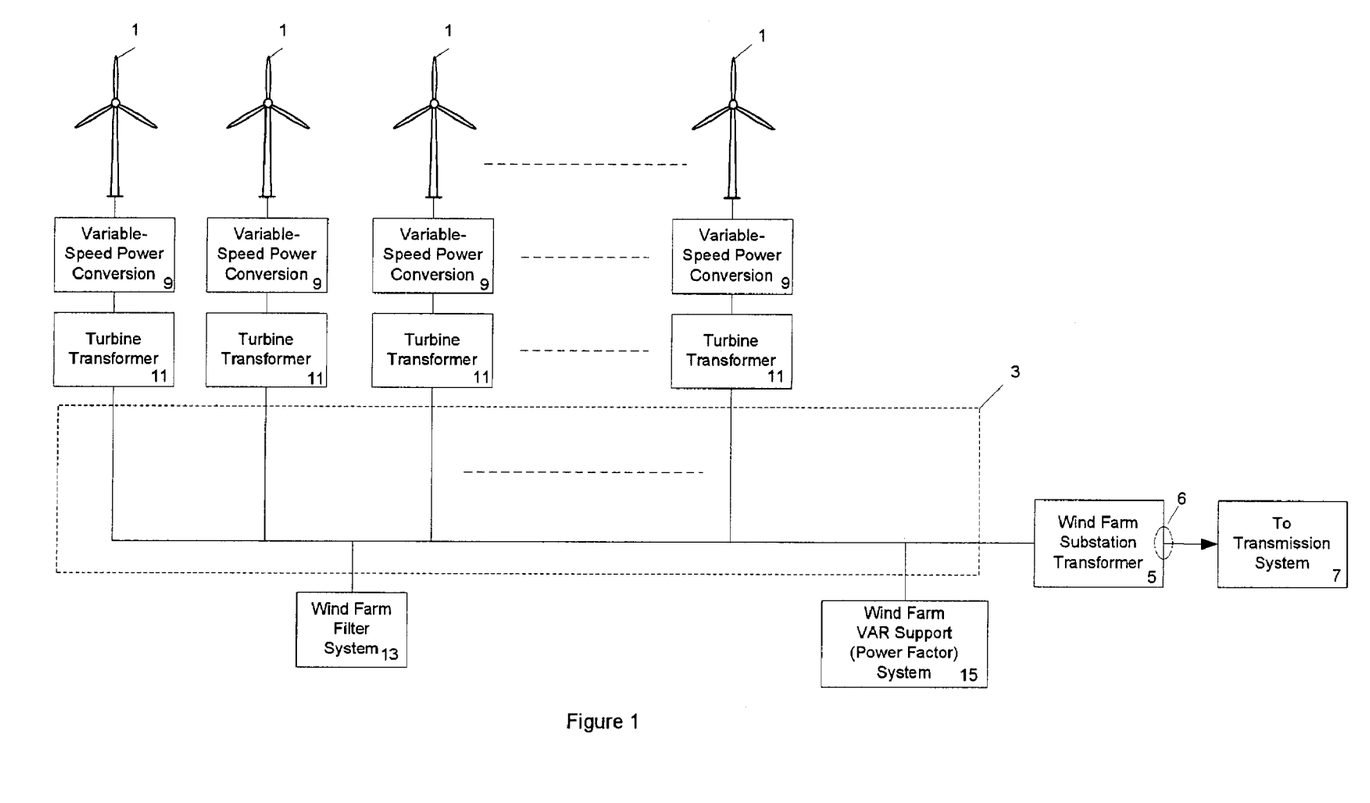
FIG. 1 is a schematic representation of a typical wind farm containing a group of variable speed wind turbines.

FIG. 1 shows a typical wind farm set up using variable speed wind turbines 1. A plurality of wind turbines 1 feed electrical power into a wind farm collection system 3 where the power is then fed into a substation transformer 5 where it is stepped up to a high transmission voltage at the point of common connection (PCC) 6 and is fed onto utility transmission lines 7. Even though the PCC 6 is on the transmission voltage side of the substation transformer 5, harmonic currents are typically measured on the low voltage side of the substation transformer 5 for convenience. Typically with variable speed wind turbines 1 the power produced is a variable frequency, variable voltage AC which needs to go through a power converter 9 to be turned into constant voltage and frequency AC which can then go through a pad mount transformer 111 to the wind farm collection system 3 at an intermediate voltage between that produced at the output of the power converter 9 and that on the high voltage transmission lines 7. FIG. 1 shows that many turbines may each supply the wind farm collection system 3 through their respective power converters 9 and turbine transformers 11. The wind farm power collection system 3 is simply a network of conductors connecting all the power producing and power conditioning elements of the wind farm to the utility substation transformer 5. Power condition elements may include a wind farm filter system 13 for reducing harmonic distortion and/or a wind farm VAR support system 15 for correcting and adjusting the power factor.

In prior art wind turbine and wind farm design, the power output from the individual wind turbines 1 and their associated variable speed power converters 9 meets strict utility power quality requirements, for instance as defined in IEEE Standard 519-1992. The filter system 13 and VAR support system 15 are supplementary to the wind turbines and make only minor adjustments. In many wind farms, no power conditioning is required nor is it used within the wind farm collection system 3 or in the wind farm interconnection substation 5. The individual wind turbines 1 are designed to generate high quality power output because they are often deployed in stand-alone or distributed generation systems in which the turbine transformer 11 at the wind turbine 1 forms the point of common coupling (PCC) with the utility grid. However, within a wind farm environment, there is excess complexity and cost designed into each wind turbine's variable speed power conversion system 9 because it isn't necessary to meet strict power quality standards at each turbine and/or within the wind farm collection system 3.

Figure 2:
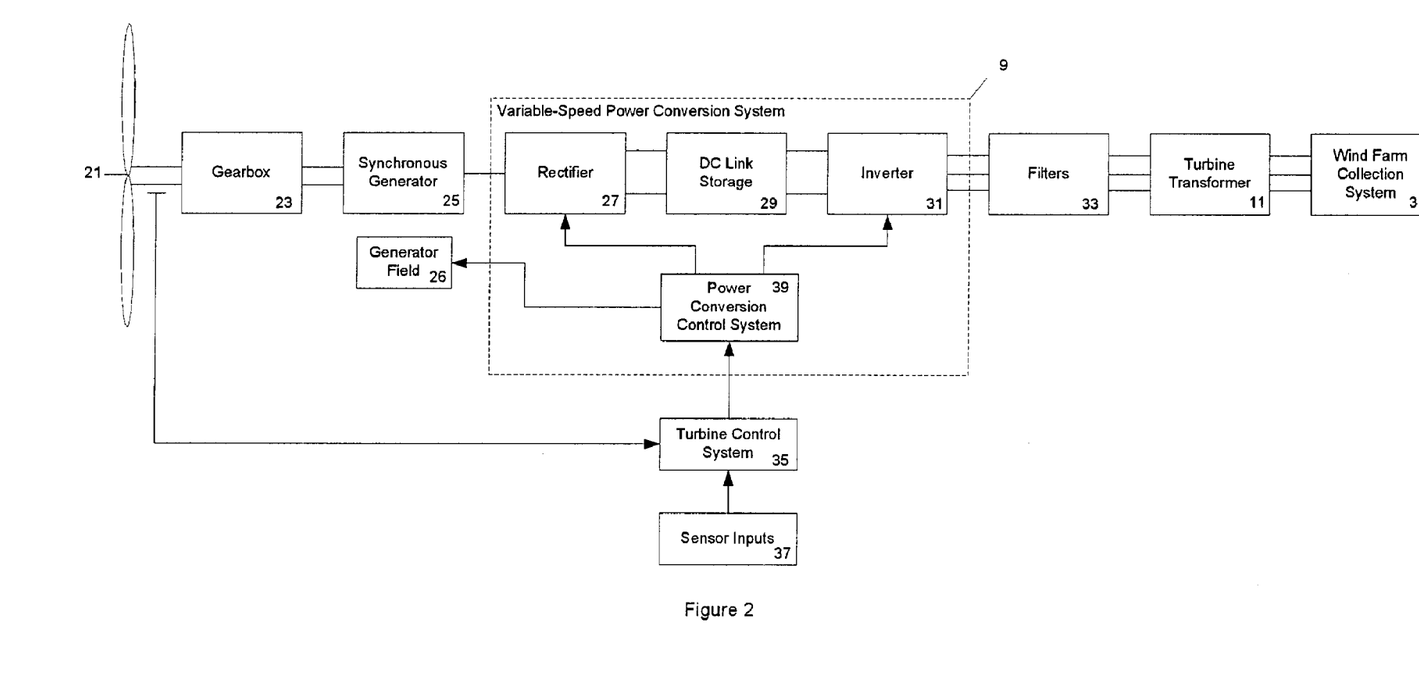
FIG. 2 is a schematic representation of one wind turbine from the wind farm in FIG. 1 showing more details for the turbine and power converter.

FIG. 2 shows in more detail the power conversion system 9 for generating electricity from kinetic energy in the wind turbine 1. Power from the wind is converted to rotational kinetic energy in a rotor 21, the rotor may be of any type used to produce wind power including rotors with one, two, three, or any number of blades and including horizontal axis rotors facing up-wind and down wind, and vertical axis rotors. The wind turbine rotor 21 should be optimized for variable speed operation. Design of the rotor 21 is within the skill of one of ordinary skill in the art and would be accomplished using the techniques described in *Wind Energy Handbook* written by Burton, Sharpe, Jenkins, and Bossanyi and published by John Wiley & Sons in 2001, *Wind Power Plants: Fundamentals, Design, Construction and Operation* written by Gasch and Twele and published by James & James in 2002, *Wind Turbine Engineering Design*, written by Eggleston and Stoddard and published by Van Nostrand Reinhold in 1987, *Windturbines*, written by Hau and published by Springer in 2000, *Wind Turbine Technology*, edited by Spera and published by ASME Press in 1994, and *Wind Energy Conversion Systems*, written by Freris and published by Prentice Hall in 1990, all of which are incorporated herein by reference. The speed of rotation is optionally increased in a gear box 23 (though some models may incorporate a direct drive, eliminating the gear box), which drives a synchronous generator 25 optionally including a controllable variable magnetic field 26. The generator 25 may optionally be an asynchronous induction generator, a permanent magnet generator, or other suitable type of generator. One of ordinary skill in the art would be capable of selecting an appropriate type and size of generator 25. Since the rotor 21 is spinning at a variable speed, the generator 25 produces variable frequency electricity which then enters the power conversion system 9. The power conversion system contains a rectifier 27 which may passively or actively convert the variable frequency AC into DC electricity which feeds into a DC link storage 29. It is also possible that a DC generator is used instead of a synchronous AC generator 25 in which case a rectifier 27 is not necessary. The DC link 29 has some amount of storage capacity in order to accept the varying feeds and draws to which it is subject. The DC storage may be in the form of inductors, capacitors, or batteries. DC power is fed from the DC link to an inverter 31 which converts the DC electricity to constant voltage, constant frequency AC electricity. The output of the inverter 31 is optionally passed through a filter 33 before entering the turbine transformer 11 which brings the voltage to that of the wind farm collection system 3.

A turbine control system 35 often employs the power conversion system 9 to control the rotational speed and torque in the wind turbine's rotor 21. The turbine control system 35 receives data from sensor inputs 37 such as wind speed, power output, rotational speed, blade pitch angle, etc, and based on this data will optionally send instructions to a power conversion control system 39 which may then modify the functioning of the inverter 31, the rectifier 27, and/or the variable field 26.

FIGS. 1 and 2 describe a typical prior art variable speed wind turbine and wind farm. It should be noted that the output of each individual inverter must create a wave form that is compatible with utility standards having low harmonic distortion and a power factor close to unity. An inverter designed to meet these standards at the 1.5 MW level is costly to construct. The present invention discloses a technique for allowing for a much simpler, lower cost inverter 31 at each wind turbine 1 while still meeting utility standards at the point of common connection 6.

The present invention utilizes simpler inverters 31 than those used in prior art power conversion systems 9 for variable speed wind turbines. They may be line commutated or self commutated and they may have a very simple current wave form output, often simply a modified square wave although a true square wave or other simple current wave form is also intended to be within the scope of the present invention. By various techniques in turbine transformer design the phase and shape of this simple wave form may be modified. It is disclosed that by using a plurality of simple wave forms modified by differently configured turbine transformers for each wind turbine a much closer approximation of a sine wave may be created within the wind farm collection system 3 such that at the utility point of common connection 6 power quality is maintained while each individual turbine 1 uses a very simple inverter 31 which by itself could not provide sufficient power quality. The disclosed technique can be used to combine any output wave form of line frequency from a plurality of wind turbine inverters, each having significant distortion from a true sine wave, with each wind turbine's current output modified differently by the respective winding arrangement of its turbine transformer, to produce a summed current wave form of sufficient power quality for utility interconnection. It is further disclosed that by viewing the wind farm system as a whole, sizing and placement the wind farm filter system 13 and VAR support system 15 may be engineered to more effectively utilize the electrical characteristics of the entire wind farm collection system.

Though this system is specifically described in a wind farm setting it is conceived that it is suitable for other applications where multiple generation sources are combined in a collection network before feeding into a utility line, such as an array of fuel cells or photovoltaic panels, variable speed hydroelectric generators, each with its own inverter and collectively connected to the grid.

Figure 3:
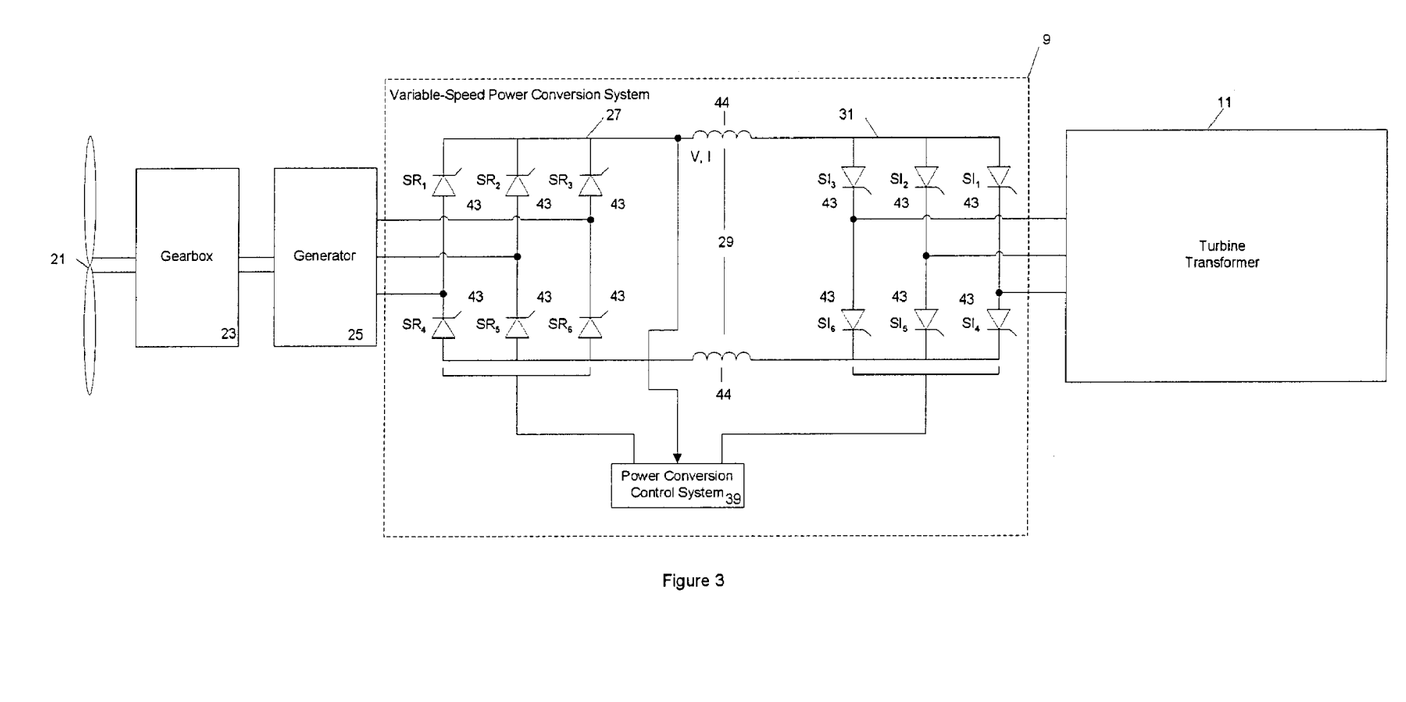
FIG. 3 is a schematic representation of a six-pulse, line commutated rectifier, inverter, and turbine transformer system for the variable speed power conversion system of the present invention.

FIG. 3 shows a method of implementing the present invention in the form of a wind turbine power conversion system. FIG. 3 shows details of a power conversion system 9 from FIG. 2 with a power conversion system controller 39 along with a rotor 21, optional gearbox 23, and generator 25. The added detail in the power conversion system 9 and the turbine transformer 11 show one embodiment in which the present invention may be implemented. A power rectifier 27 is shown to include silicon controlled rectifier (SCR) elements 43 which limit maximum voltage on the DC link 29. The SCRs 43 convert the variable frequency and variable voltage three phase AC power from the generator 25 into DC electricity. In this example, induction coils 44 are used for energy storage on the DC link 29. It is shown that the inverter 31 also includes SCRs 43 which are line commutated such that they open and close in an exact pattern synchronous with the voltage on the three phases of the turbine transformer 11. The current output wave form on each phase resembles a modified square wave and is the well known six pulse wave form. The term six pulse results from the fact that there are six distinct current pulses in the DC link during of every cycle of the AC line. The level of DC voltage at the inverter 31 controls the DC current and therefore the torque in the generator. The DC voltage is controlled by the chosen phase relationship between the current output wave forms and AC voltage wave forms, and is controlled by the selection of the firing angle of the SCRs in the inverter 31. A conventional turbine transformer 11 utilizes a wye-wye or a wye-delta winding.

Figure 4:
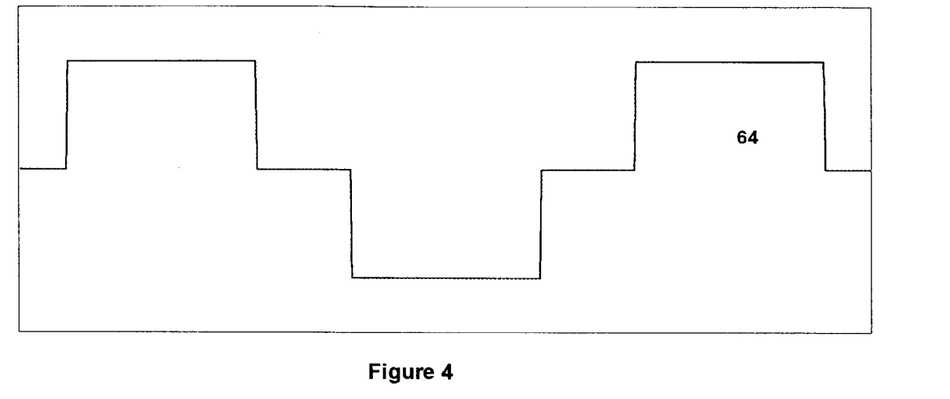
FIG. 4 is a graphical representation of the six pulse current output of a line commutated rectifier, inverter, transformer system with a wye-wye turbine transformer connection.

The current wave form of one of the three phases at the turbine transformer 11 output to the collection system 3 for the turbine system shown in FIG. 3 is shown in FIG. 4 for the case where the turbine transformer is a wye-wye. A detailed discussion of this wave form can be found in Ned Mohan, Tore M. Undeland, William P. Robbins *Power Electronics: Converters, Applications, and Design* Publisher: John Wiley & Sons; 3rd edition (October 2002) ISBN: 0471226939, Schafer, Johannes, *Rectifier Circuits: Theory and Design,* John Wiley & Sons, Inc., 1965, Library of Congress: 65-12703 and, Pelly, B. R., *Thyristor Phase-Controlled Converters and Cycloconverters, Operation, Control, and Performance,* Wiley Interscience, 1971, Library of Congress: 70-125276 all three incorporated herein by reference. Appropriate sizing of the power electronics and transformers are within the ability of one of ordinary skill in the art utilizing the teachings of the above referenced textbooks.

A zig-zag, wye-delta, extended delta, or similar type of transformer provides phase multiplication, which consists of two functions. First, it shifts the phase of the original wave form. Second, in so doing it creates an asymmetric six pulse wave form from the original 'modified square wave'. A zig-zag, wye-delta, extended delta, or similar type of turbine transformer creates a low voltage side voltage wave form for each phase that is composed of the sum of two phases of the high voltage side voltage wave form in the proper proportions for the 60 Hz (or 50 Hz) wave form on the low voltage side to be shifted by a predetermined angle relative to the high voltage side. The proportions are determined by the relative numbers of winding turns in each leg of the transformer. This transformer connection causes the current wave forms on the high voltage side to be similarly composed of the summation of the two low voltage side current wave forms from two different phases in the same proportion. In doing so the transformer arrangement creates an asymmetric six pulse current wave form from the original "modified square wave". Different phase shifts and current wave forms can be created with different ratios of winding turns. A description of phase multiplication techniques can be found on pages 55 to 72 of *Rectifier Circuits: Theory and Design* by Johannes Schafer, which is referred to above and incorporated herein by reference. A discussion of phase multiplication can also be found on pages 46 and 47 of *IEEE Std 519-1992, IEEE Recommended Practices and Requirements for Harmonic Control in Electrical Power Systems,* Institute of Electrical and Electronics Engineerins, Inc., New York, N.Y., 1993, ISBN 1-55937-239-7 which is incorporated herein by reference.

Figure 5:
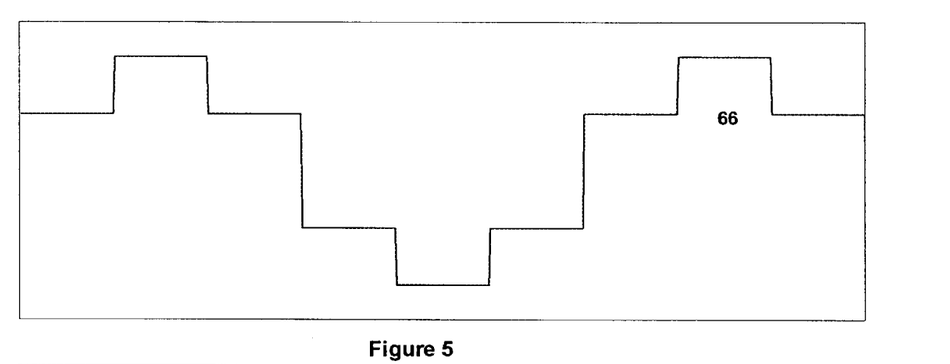
FIG. 5 is a graphical representation of the six pulse current output of a line commutated rectifier, inverter, turbine transformer system with wye-delta connection.

If the turbine transformer is selected as a wye-delta then the current wave form of one of the three phases at the collection system 3 is shifted by 30 degrees and is shown in FIG. 5.

Figure 6:
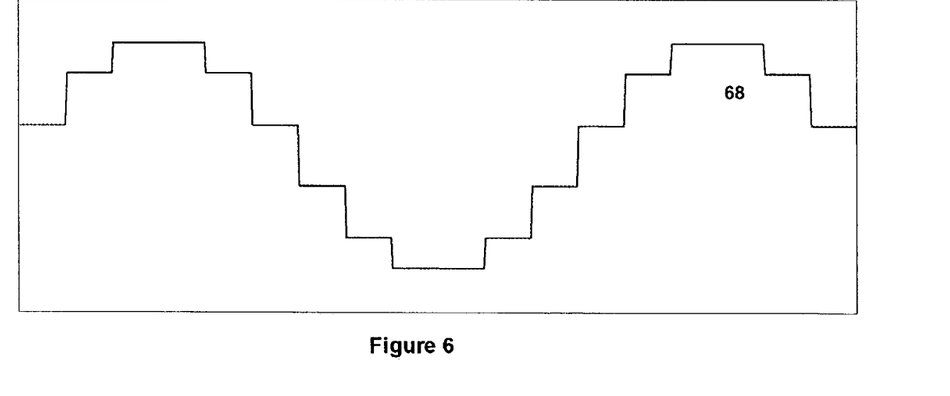
FIG. 6 is a graphical representation of the twelve pulse current output that results from summing the current outputs shown in FIGS. 4 and 5 in a collection system.

By combining the current wave forms of FIG. 4 with that of FIG. 5, the current wave form shown in FIG. 6 is realized. This wave form is referred to as a twelve pulse wave form and is the combination of the two six pulse wave forms. In a similar manner which is discussed in the references above, three, or four inverter current wave forms could be combined to provide an even higher effective pulse count wave form from the fundamental six pulse wave form.

Figure 7:
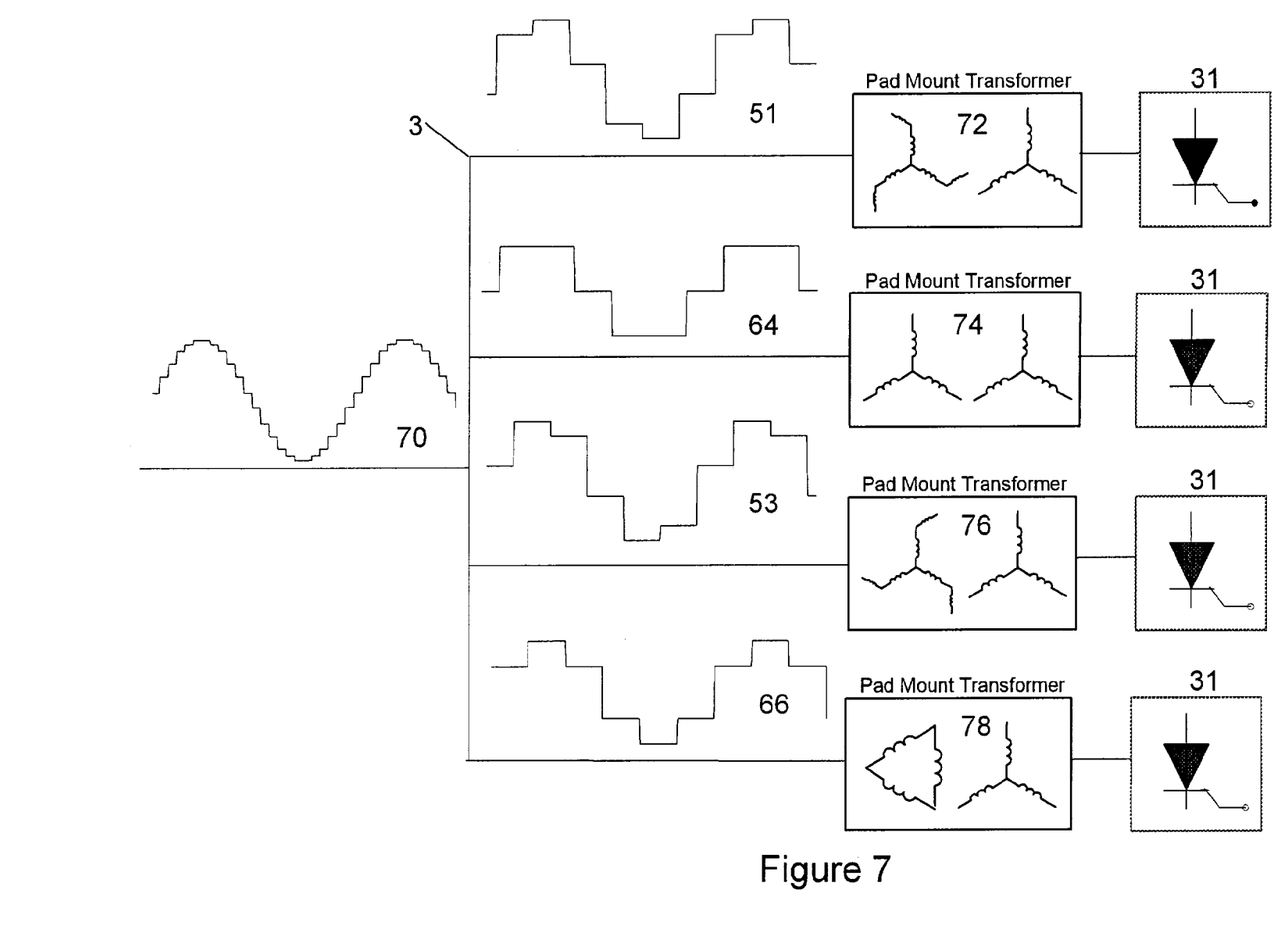
FIG. 7 is a schematic representation of a grouping of four wind turbines to create a 24 pulse wave form.

An example of a grouping of four wind turbines to achieve a twenty four pulse wave form is shown in FIG. 7. One of the wind turbines (shown second to the top) has a wye-wye transformer 74 and its wave form 64 is not shifted. One of the wind turbines (shown at the bottom of the figure) has a wye-delta transformer 78 and its wave form 66 undergoes a 30 degree phase shift. The remaining two wind turbines utilize zig-zag transformers, one with a +15 degree phase shift and one with a −15 degree phase shift. The combination of the four wave forms from the four wind turbines results in a 24 pulse wave form 70 as shown at the wind farm's PCC.

Figure 8:
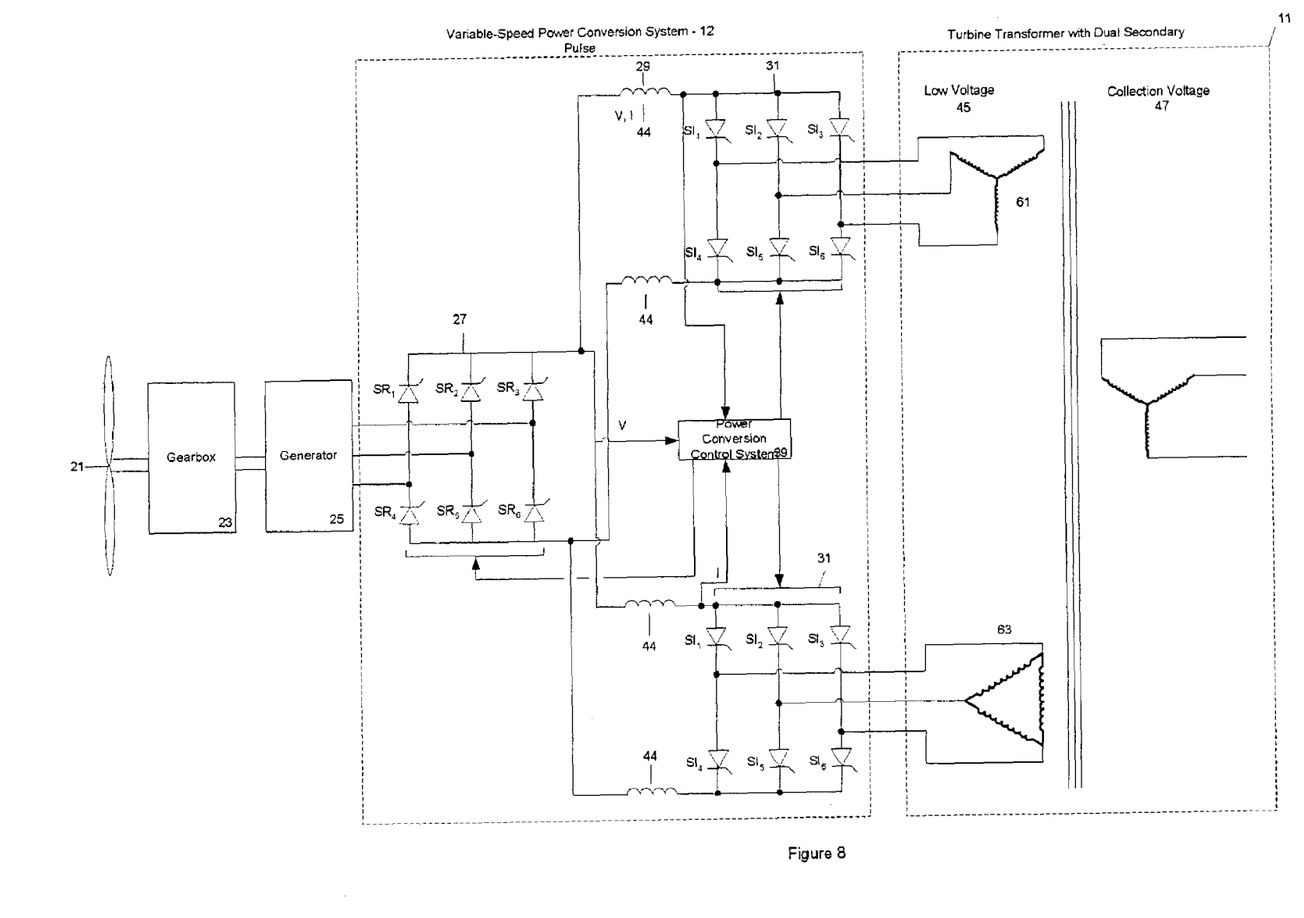
FIG. 8 is a schematic representation a tertiary wound wye-wye and wye-delta turbine transformer that could be included into a single turbine system to obtain a twelve pulse wave form.

FIG. 8 shows a wind turbine system with a single rectifier 27, energy storage inductors 44 combined to make up the energy storage element in the DC link 29 and two inverters 31. The turbine system utilizes a turbine transformer with wye wound collection system winding 47 and two low voltage turbine windings, one a wye 61 and one a delta 63. This is an approach to improving the current wave form of a single turbine by combining the wave forms of FIG. 4 and FIG. 5 at the wind turbine level. Unfortunately this straight forward approach carries a heavy burden in increasing the cost of the turbine converter system. In the present invention, turbines are grouped, for example in two's, three's, or four's utilizing the simple, low cost six pulse converter of FIG. 3 together with a proper selection of turbine transformers to obtain twelve, eighteen, or twenty four pulse wave form respectively at the collection system 3. The table below tabulates the pulse count and transformer requirements for different turbine grouping numbers.

TABLE 1

Grouping of turbines and transformer phase angle for various wave forms.

| Group Description | # Turbines/ Group | Required Transformer Phase Angle |
|---|---|---|
| 6-Pulse | 1 | 0 Degrees |
| 12-Pulse | 2 | 30 Degree |
| 18-Pulse | 3 | 20 Degree |
| 24-Pulse | 4 | 15 Degrees |

Turbine grouping of higher pulse inverters such as the 12 pulse inverter system shown in FIG. 7 may also be used. In this case, two turbines would form a group and the turbine transformers would be selected so as the provide a 24 pulse wave form from two turbines rather than the four turbines required when a six pulse converter is used on each turbine.

A technical question arises when comparing turbine grouping with simply providing a high pulse count inverter on each turbine as described in FIG. 8. In FIG. 8, both converters are operating at the same power level, half of the turbine output, and at the same DC voltage. Under these conditions, the current wave forms combine almost exactly to produce the twelve pulse wave form. When the converter and turbine transformers are on separate turbines, there is no assurance that power level of the turbines will be the same and the wave forms may not combine properly to obtain the twelve pulse wave shape seen in FIG. 6 (or eighteen, or twenty four pulse in the case of three or four turbine grouping). To understand how the turbine grouping becomes effective there are two distinct regions of turbine operation that need to be considered. The first and simplest is the conditions when all the turbines in a wind farm are operating at or above rated speed. In this case all turbines do produce very nearly the same power and do operate at the same DC voltage and the idealized current wave forms at the collection system are very nearly realized. In the second case, when a large group of turbines are applied in a wind farm below rated windspeed, and a fixed tip-speed ratio is followed, there is a statistical filtering of turbine power and DC voltage which causes the current wave form at the collection system to actually improve beyond the twelve, eighteen, or twenty four pulse cases. This statistical filtering has always been observed in wind farm power levels where it is common for a single wind turbine power level to be changing substantially and at a high rate, but the combination of the turbine power levels, that is the wind farm power level, remains quite constant. Because of the statistical nature of the wind, it can be shown that this filtering improves with increasing numbers of turbines. This is the basis for turbine grouping.

Figure 9:
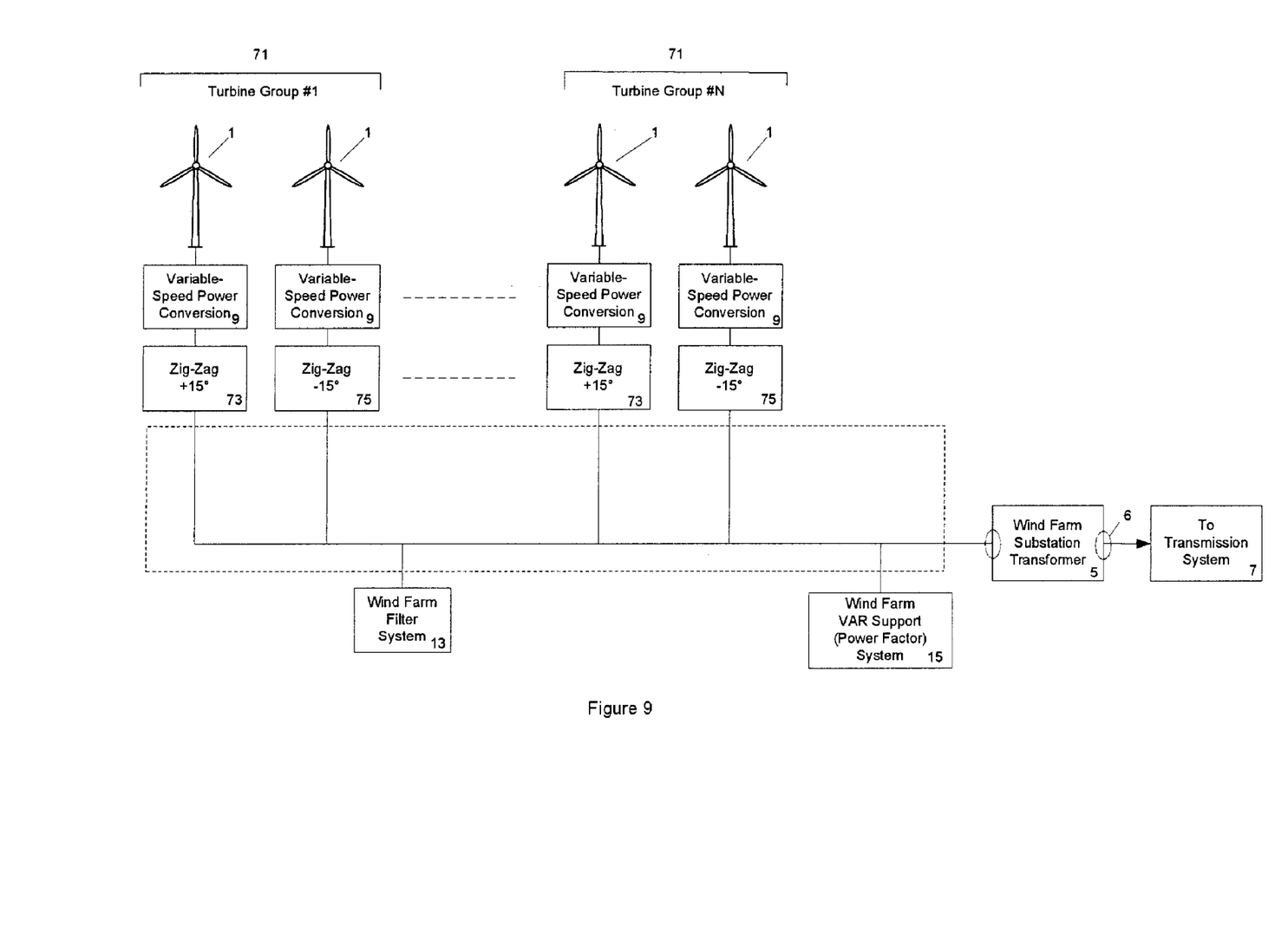
FIG. 9 is a schematic representation of a wind farm utilizing the wind turbine grouping concept with different turbine transformers to achieve a twelve pulse collection system current wave form, with a six pulse current wave form for each turbine.

FIG. 9 shows a wind farm using a turbine grouping of two turbines. From table 1 above it can be seen that the turbine transformers require a thirty degree phase shift between the two turbine to achieve the twelve pulse wave form. This could be accomplished using a wye-wye turbine transformer on one turbine and a wye-delta transformer on the other turbine. Alternatively, as shown in FIG. 9, zig-zag transformers could be used, one with a +15 degree phase shift and the other with a −15 degree phase shift. A third example is the use of an extended delta turbine transformers to obtain the necessary thirty degree phase shift. The actual selection of the turbine transformer will be based on items other than the required phase shift, for example, grounding of the turbine system, and wind farm protective relaying. Information about transformer design, grounding, power quality, and other aspects of wind farm integration with the utility grid can be found in Heier, Siegfried, *Grid Integration of Wind Energy Conversion Systems,* John Wiley & Sons, Inc, 2002, ISBN: 0-471-97143-X which is incorporated herein by reference. These issues can be dealt with by using a variety of transformer configurations. However, for purposes of the invention described herein, the phases shift described in Table 1 must be followed.

FIG. 9 also shows a wind farm filter system 13 and VAR support system 15. Because the requirement of meeting power quality standards has been moved from the wind turbine to the wind farm PCC, there is great latitude in designing the filter system 13. It should be pointed out that even with turbine grouping, there remain harmonics in the current wave form of the collection system. If for example, a turbine grouping of two is used and a twelve pulse wave form is realized, then the $11^{th}$ and $13^{th}$ harmonics remain and are dominant. These harmonics are reduced further by wind farm collection system impedances, and these impedances which are inherent to the collection system 3 can be utilized effectively in the design and location of filter system 13. While, the exact location and design of the filter are addressed on a project-by-project basis, in general the filter performance is enhanced by having impedance between the filter and the turbines and by impedance between the filter and the wind farm substation transformer. For this reason it is likely that most filters will be located midway between the turbines and the substation PCC. Since large wind farms can take up many square miles, these impedances are not trivial and the flexibility to locate such a filter is usually provided. While it is possible to locate a filter at each turbine group this is not usually required and the filter will be used to address more than one group of turbines.

Figure 10:
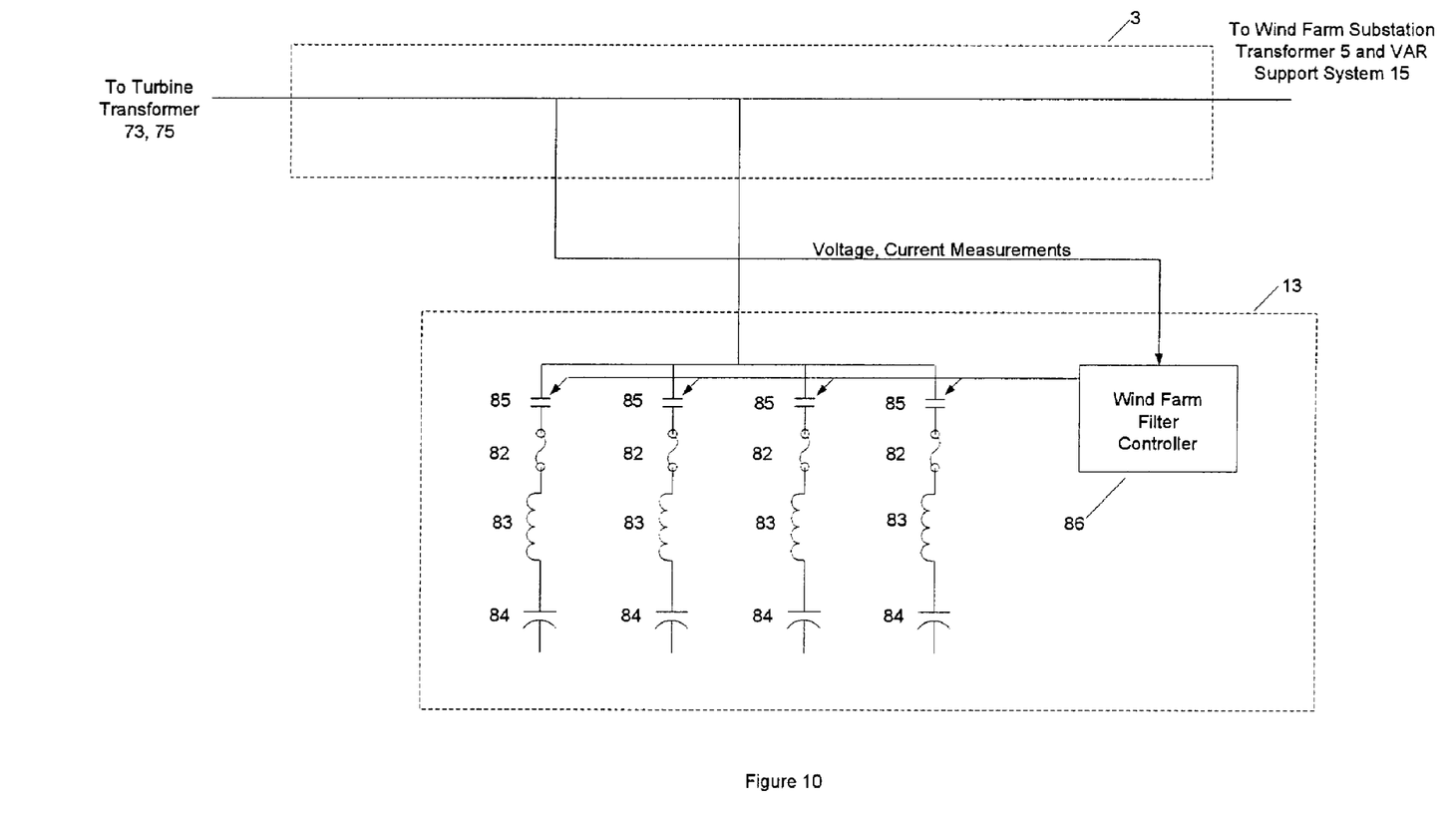
FIG. 10 is a schematic representation of a wind farm filter system.

FIG. 10 is a representation of the elements which make up the wind farm filter system 13. The interconnection of the wind farm filter system 13 is shown together with the wind farm collection system 3. Within the filter, there are protective fuses 82, series inductors 83, series capacitors 84, and contactors 85 for selection. The fuses 82 serve to provide protection against faults in the inductors and capacitors and disconnect the respective device in the event of such a fault. The inductors 83 are used to detune the capacitor 84 circuits so as to prevent resonance problem. The inductors are selected in all branches so as to attenuate the lowest order dominant harmonic. In the case of turbine grouping of two this is the $11^{th}$ and $13^{th}$ harmonic, so the inductor is tuned for the $11^{th}$ harmonic such that the $12^{th}$ and $13^{th}$ side bands are attenuated. The inductor 83 further serves to limit the in-rush current to the capacitor and eliminates false clearing of the fuse by so doing. The filter is shown with four switchable banks of capacitors, however, other number of switchable branches are possible. The capacitors are arranged in a two's complement weighting so as to provide the finest resolution of capacitance for the fewest number of steps. An example of two's complement weighting will be given in the discussion of the VAR support system. The controller 86 shown monitors the power factor of the collection system at the filter's point of coupling to the collection system and switches capacitance in and out in an attempt to maintain the desired power factor, with a 0.95 lagging power factor being a typical value selected. The filter 13 has a leading power factor associated with it but when combined with the lagging power factor of the converter and turbine transformer, the result is a lagging power factor. An important difference between filter system and the VAR support system is that the filter has a dedicated task of keeping the collection system at a fixed power factor, typically 0.95 lagging, and does not respond to a desired, or requested number of VARs as does the VAR system.

The wind farm VAR support system 15 described herein is shown in FIG. 9. This system works together with the filter system 13 in providing the required VAR support at the wind farm PCC. A detailed illustration of the wind farm VAR support system 15 is provided in FIG. 11. This figure shows the interconnection of the VAR source 15 to the wind farm collection system 3. The VAR system contains as its major elements fuses 92, inductors 93, capacitors 94, and contactors 95 for branch selection. The fuses, inductors, capacitors, and contactors play the same role in this VAR source as that described in the filter system. The selectable capacitor banks are again weighted according to a two's complement system so as to achieve the finest resolution with the fewest number of switchable steps. An example of this would be the selection of a 1, 2, 4, and 8 MVAR capacitor banks. This weighting allows the VAR source to achieve up to 15 MVAR in 1 MVAR steps. For finer resolution than 1 MVAR, a static active VAR source 96 is included in the VAR support system. The static VAR source is constructed of solid state switches such as IGBT's or SCRs and allows for continuously variable operation from zero up to the rating of the device. In the example being discussed, the static VAR source would be sized at 1 MVAR to make up for the 1 MVAR steps of the switchable banks. The VAR support system controller 98 receives remote command inputs 97 to tell the wind farm how much VAR support to provide. In the example being discussed, the wind farm is capable of providing continuously adjustable VARs which lead to a wind farm power factor within the range of 0.95 lagging to 0.95 leading. The purpose of the filter system 13 was to reduce harmonics, but also to keep the power factor in the collection system 3 to 0.95 lagging. Any additional VARs to be provided by the wind farm must come from the VAR support system 15.

Figure 11:
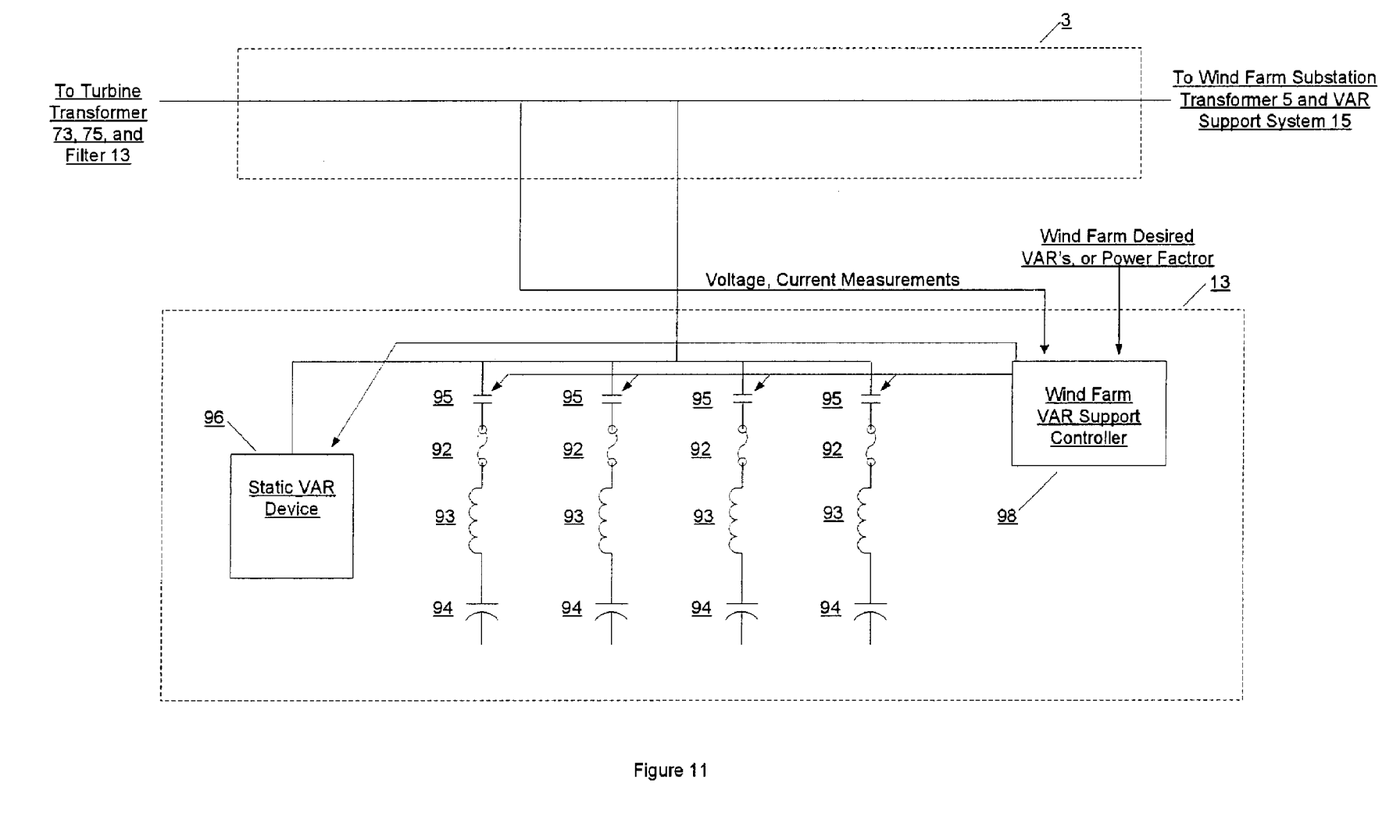
FIG. 11 is a schematic representation of a wind farm VAR support system.

In addition to providing VARs, the static VAR component in the VAR support system 96 has filtering capabilities. The static VAR source 96 is a solid state device that is capable of injecting currents with various attributes into the wind farm electrical collection system 3. The VAR support system controller 98 could be devised to measure harmonic currents in the collection system 3. The controller 98 could then direct the static VAR source 96 to inject currents that are equal but opposite to the distortion component of the harmonics in the collection system 3. The harmonic cancellation currents would be required to be 180 degrees out of phase with the harmonic currents in the collection system. In order to provide the necessary cancellation currents, the solid state switching devices in the static VAR source 96 would be required to have a very high switching frequency.

Figure 12:
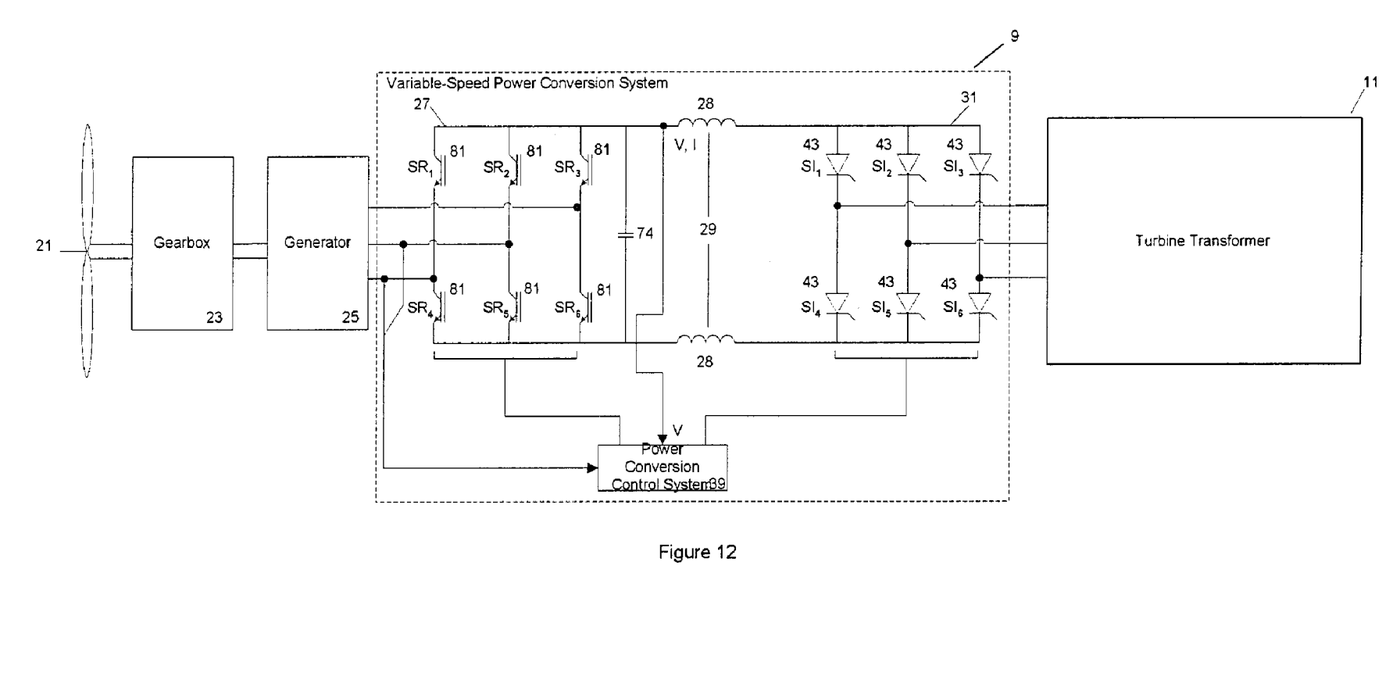
FIG. 12 shows an example of a turbine system utilizing an asynchronous generator and active rectifier system in the present invention.

FIG. 12 is a graphical representation of a wind turbine power converter system that utilizes an asynchronous generator. This figure is included to show how the invention described herein can be extended beyond the permanent magnet synchronous generator approach described in detail. In FIG. 12 the turbine rotor 21 is optionally connected to a gearbox 23 which in turn is connected to a generator 25. The output of the generator is connected to an active rectifier 27 which contains IGBTs. The active rectifier is used with the asynchronous generator because the excitation for the generator must be supplied by the DC bus through the rectifier. The rectifier requires an energy storage element in the form of a capacitor bank 74. Additional energy storage is provided by inductors 28 to make up the rest of the energy storage in the DC link 29. The inverter 31 containing SCR switches 43 operates the same as discussed previously and can be coupled to a turbine transformer with wye-wye, wye-delta, zig-zag, or extended delta winding. Since the operation of the inverter 31 is the same as previously discussed, turbine transformers can be selected and turbine grouping applies as discussed.

Figure 13:
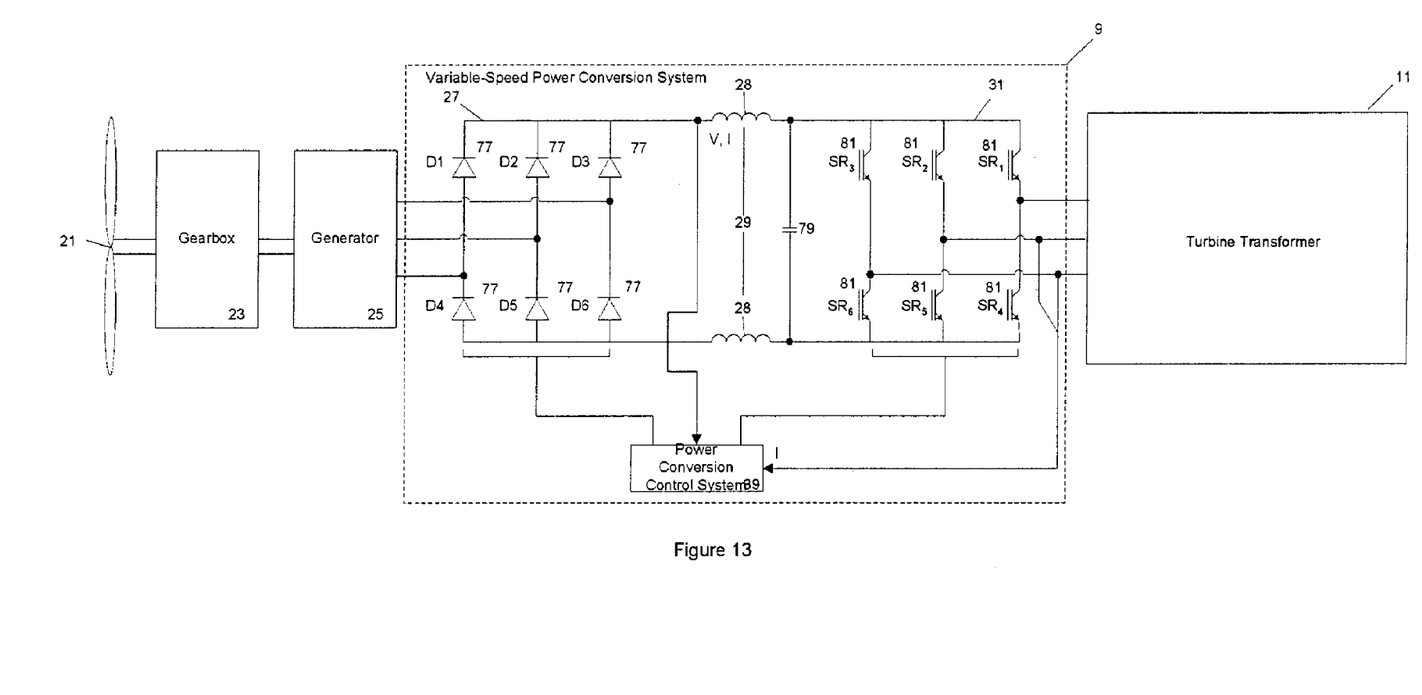
FIG. 13 is an example of a turbine system utilizing a synchronous machine and a self commutated inverter in the present invention.

FIG. 13 is an example of a turbine power conversion system using a self commutated inverter as the connection to the turbine transformer. Turbine rotor 21 is mechanically connected to a gearbox 23. The high speed shaft of the gear box is then connected to a synchronous generator 25. The generator electrical output is then connected to the passive rectifier system consisting of diodes. Again, it is possible that the turbine design may not require a gearbox and the generator may be directly coupled to the turbine rotor as well as the rectifier system. The rectifier transfers electrical DC current to the energy storage device 29 made up of inductors. The inverter in this figure is a self commutated inverter and does not rely on the utility system for commutation. None-the-less many self commutated systems contain significant harmonic content which can be canceled by the use of turbine grouping and turbine transformer selection.

From the above description and figures, it will be apparent that the invention disclosed herein provides a novel and advantageous wind farm collection system for variable speed wind turbines. The foregoing discussion discloses and describes merely exemplary methods and embodiments of the present invention. As will be understood by those familiar with the art, the invention may be embodied in other specific forms without departing from the spirit or essential characteristics thereof. For example, applying a twelve pulse inverter on a single wind turbine and grouping of two turbines leads to a twenty four pulse wave form from two turbines. Like wise, the generator could be a six phase generator rather than a three phase generator. Self commutated inverters using gate-turn-off (GTO) devices may be employed instead of the IGBT self commutated inverter. Accordingly, the disclosure of the present invention is intended to be illustrative, but not limiting, of the scope of the invention, which is set forth in the following claims.

What is claimed is:

1. A wind farm comprising:
a plurality of variable speed wind turbines, each of which comprises a multiphase generator that produces electrical output with varying frequency, and a power converter for converting said varying frequency electrical power into constant frequency power with a low pulse number, wherein each of said wind turbines produces multi-phase alternating current electrical output with a wave form consisting of a fundamental component and harmonics thereof;
a turbine transformer at each of said wind turbines wherein the turbine transformer of at least one wind turbine shifts the phase of the voltage wave form of the output of said at least one wind turbine relative to the output of the other wind turbines; and
an electrical collection system that aggregates the outputs of said plurality of wind turbines wherein said turbine transformers at said wind turbines perform phase multiplication on the output of said power converters to create a high pulse number approximation of a sine wave at an interconnection point with a utility grid and wherein one or more of the harmonic components of the outputs of said wind turbines are substantially canceled in said collection system.

2. The wind farm of claim 1 wherein each said transformer is a zig-zag wound transformer.

3. The wind farm of claim 2 wherein said zig-zag transformers provide a phase shift in the voltage wave form that varies between wind turbines thereby to substantially cancel harmonic content in the output of said wind turbines.

4. The wind farm of claim 1 wherein said turbine transformer of said at least one wind turbine is a zig-zag wound transformer.

5. The wind farm of claim 1 wherein said turbine transformer of said at least one wind turbine is a wye-delta wound transformer.

6. The wind farm of claim 1 wherein said turbine transformer of said at least one wind turbine is an extended delta wound transformer.

7. The wind farm of claim 1 wherein at least the $5^{th}$ and $7^{th}$ harmonies of the outputs of said wind turbines are canceled in said electrical system.

8. A wind farm comprising:
a plurality of variable speed wind turbines, each of which comprises a multiphase generator that produces electrical output with varying frequency, and a power converter for converting said varying frequency electrical power into constant frequency power with a low pulse number;
a turbine transformer at each of said wind turbines wherein the turbine transformer of at least one wind turbine shifts the phase of the voltage wave form of the output of said at least one wind turbine relative to the output of the other wind turbines; and
an electrical collection system that aggregates the outputs of said plurality of wind turbines wherein said turbine transformers at said wind turbines perform phase multiplication on the output of said power converters to create a high pulse number approximation of a sine wave at an interconnection point with a utility grid.

9. A wind farm comprising:
a plurality of variable speed wind turbines, each of which comprises a multiphase generator that produces electrical output with varying frequency, and a power converter for converting said varying frequency electrical power into constant frequency power, wherein each of said wind turbines produces multi-phase alternating current electrical output with a wave form consisting of a fundamental component and harmonics thereof;
a turbine transformer at each of said wind turbines wherein the turbine transformer of at least one wind turbine shifts the phase of the voltage wave form of the output of said at least one wind turbine relative to the output of the other wind turbines; and
an electrical collection system that aggregates the outputs of said plurality of wind turbines wherein said turbine transformers at said wind turbines perform phase multiplication on the output of said power converters wherein one or more of the harmonic components of the outputs of said wind turbines are substantially canceled in said collection system.

* * * * *